United States Patent Office 3,784,651
Patented Jan. 8, 1974

3,784,651
TERTIARY PHOSPHORIC ESTERS OF TRICYCLIC ALIPHATIC ALCOHOLS
Yoshiaki Inamoto, Wakayama, and Takeji Kadono, Kainan, Japan, assignors to Kao Soap Co., Ltd., Tokyo, Japan
No Drawing. Filed June 22, 1971, Ser. No. 155,610
Claims priority, application Japan, June 24, 1970, 45/54,978
Int. Cl. C07f 9/08
U.S. Cl. 260—956                                         1 Claim

ABSTRACT OF THE DISCLOSURE

A compound of the formula

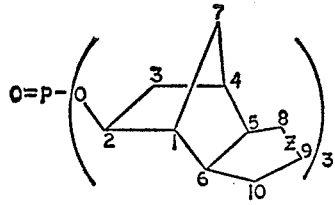

wherein Z is a single or double bond, is prepared by reacting 2-exo-hydroxy-exo-trimethylenenorbornane or 2-exo-hydroxy-2,3-dihydro-exo-dicyclopentadiene with phosphorus oxyhalide, in the presence of heterocyclic aromatic tertiary amine having a nitrogen atom as a member of the heterocyclic ring. The compounds are useful as additives for synthetic lubricants and hydraulic oils.

BACKGROUND OF THE INVENTION

Field of the invention

This invention relates to a process for manufacturing novel tertiary phosphoric esters having tricyclic aliphatic hydrocarbon residues, which esters have the formula

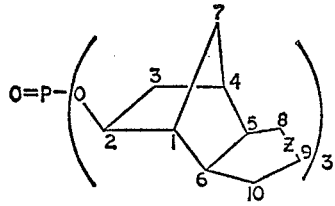

More particularly, the present invention relates to a process for manufacturing tertiary phosphoric esters represented by the Formula I, in which Z represents a single or a double bond, and which contains partially or fully hydrogenated exo-dicyclopentadien-2-exo-yl groups.

Description of the prior art

Alcohols corresponding to tricyclic aliphatic hydrocarbon residues of the compound (I), that is, 2-exo-hydroxy-exo-trimethylenenorbornane (Z being a single bond) and 2-exo-hydroxy-2,3-dihydro-exo-dicyclopentadiene (Z being a double bond) are compounds which have been synthesized before (H. A. Bruson and T. W. Reiner, J. Am. Chem. Soc., 67, 723 (1945)), but their tertiary phosphoric esters are novel compounds which have never been synthesized before.

DETAILED DESCRIPTION

The compounds produced by the process of this invention are very useful substances, because they are much superior to conventional phosphoric esters having linear aliphatic or aromatic residual groups in such properties as viscosity index, friction coefficient and antioxidant property when used as additives for synthetic lubricants and hydraulic oils, and also have many other characteristics advantageous properties that the conventional ones do not possess.

The process of this invention is characterized by the reaction of the alcohol corresponding to the tricyclic aliphatic hydrocarbon residue of the compound (I) with a phosphorus oxyhalide in the presence of a heterocyclic aromatic tertiary amine having a nitrogen atom as a member of the ring, for example, pyridine or quinoline. The reaction can be illustrated by the following scheme (1),

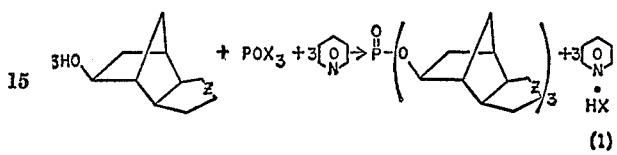

(1)

wherein X stands for a halogen atom such as chlorine, bromine or iodine, and pyridine is used as the tertiary amine.

In the process of this invention, only heterocyclic aromatic tertiary amines are effective as dehydrohalogenation agent. This is well demonstrated by our following experiment: when teritary amines other than the above-described ones, for example, aliphatic tertiary amines such as trimethylamine, triethylamine, dimethyl laurylamine, or aromatic tertiary amines such as dimethylaniline, dimethyl-p-toluidine, diethylaniline, 4,4′-bis(diethylamino)diphenylmethane, were used, the desired tertiary phosphoric esters were not produced substantially, but the reaction stopped at the stage of the secondary esters, even if a large excess of the alcohol was used. This fact suggests the following generalization that the tertiary amines having the nitrogen atom with a planar orbital configuration ($sp^2$) are effective in this reaction while those having the pyramidal ($sp^3$ hybridization) nitrogen are ineffective. The difference between the two kinds of tertiary amines is considered to arise from the steric requirement at the reaction center. The pyramidal nitrogen atom, around which three alkyl or aryl groups are crowded together, will not be able to approach sufficiently close to the reaction center, where the third halogen atom to be abstracted by the amine is bound to the phosphorus atom which, in turn, has been bound through oxygens to two bulky alcohol residues.

The heterocyclic aromatic tertiary amines to be employed effectively in the process of this invention may be any ones that satisfy the above-described structural feature of the nitrogen atom and that, at the same time, has enough basicity to form salts substantially with halogenated hydrogen. As typical ones there may be exemplified pyridine, alkyl-substituted pyridines (alkyl=$C_1$–$C_4$) such as isomeric picolines, lutidines, and colidines, quinoline, isoquinoline and their alkyl-substituted (alkyl =$C_1$–$C_4$) derivatives. It is obvious that any mixtures of these compounds can be employed.

The amounts of the amine and the alcohol to be employed are at least 3 moles of each per one mole of phosphorus oxyhalide. The use of an excess of those two reagents does not result in any undesirable side reactions.

It is advantageous to use reaction solvents in the practice of this invention, because the tertiary phosphoric esters to be produced are very viscous at the reaction temperature and also the hydrogen halide salts of amines are usually solid. The use of non-polar solvents such as petroleum ether, n-hexane, n-heptane, cyclohexane, benzene, or toluene makes the separation of the desired product from the reaction mixture easy, as the starting materials and the produced tertiary phosphoric esters are soluble in these solvents while the hydrogen halide salts of amines are insoluble therein.

EXAMPLE 1

Preparation of tris(exo-trimethylenenorbornyl-(2)-exo) phosphate (I, Z=single bond)

To a solution consisting of 128.5 parts of 2-exo-hydroxy-exo-trimethylenenorbornane, 73.4 parts of pyridine, and 150 parts by volume of benzene at a temperature of 0° C.–5° C., were added dropwise with stirring 43.1 parts of phosphorus oxychloride over a period of 3 hours. After the addition was completed, the mixture was stirred for 30 minutes at the same temperature, and then heated with stirring under reflux for 2 hours. The reaction mixture was allowed to cool, and then the precipitated pyridine hydrochloride was filtered. The solids were washed with a small amount of benzene, and the combined filtrate and washings were washed twice, each time with 150 parts by volume of cold water, and then dried over anhydrous sodium sulfate.

The benzene solution was heated (at a bath temperature lower than 150° C.) under reduced pressure (10.5 mm. Hg) to distill off low-boiling fractions, giving 127.0 parts (93.5% yield) of a pale yellow, viscous product as the distillation residue. $n_D^{25}$ 1.5207.

*Analysis.*—Found (percent): C, 71.3; H, 9.1; O, 14.4; P, 5.60. Calculated for $C_{30}H_{45}O_4P$ (percent): C, 71.97; H, 9.06; O, 12.78; P, 6.19.

IR spectrum (cm.$^{-1}$, liquid film):

1375 (m.), 1450 (m), and 1475 (m.): $\delta$C—H (H's on the exo-trimethylenenorbornane ring)
1270 (m.): $\nu$P=O (tertiary phosphoric ester)
1040 (m.) and 1000 (s.): $\nu$C—O (P—O—C)

NMR spectrum ($\tau$, CCl$_4$ solution):

5.5–6.0 (multiplet, 3H):

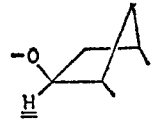

7.5–9.5 (complex multiplet, 52H): other H's on the rings. The fine structure of this multiplet resembles that of the starting alcohol, thus confirming the existence of the tricyclic structure.

EXAMPLE 2

Preparation of tris(2,3-dihydro-exo-dicyclo-pentadienyl-(2)-exo) phosphate (I, Z=double bond)

To a solution consisting of 105 parts of 2-exo-hydroxy-2,3-dihydro-exo-dicyclopentadiene, 60.9 parts of pyridine and 100 parts by volume of benzene kept at a temperature of 0° C.–5° C., was added dropwise with stirring a solution of 35.8 parts of phosphorus oxychloride dissolved in 50 parts by volume of benzene over a period of 2 hours. After the addition had been completed, the mixture was stirred for a further period of 30 minutes at the same temperature, and then it was refluxed for 1 hour with stirring. The reaction mixture was allowed to cool and the precipitated pyridine hydrochloride was filtered. The precipitated crystals were washed with a small amount of benzene. The combined filtrate and washings were washed twice, each time with 150 parts by volume of cold water, and dried over anhydrous sodium sulfate.

The benzene solution was heated (at a bath temperature below 130° C.) under reduced pressure (0.1 mm. Hg) to distill off benzene and any low-boiling fractions to give 99.6 parts of the desired product (I, Z=double bond), which was a pale yellowish, viscous liquid $n_D^{25}$ 1.5372.

*Analysis.*—Found (percent): C, 7.10; H, 7.9; O, 13.4; P, 5.5. Calculated for $C_{30}H_{39}O_4P$ (percent): C, 72.85; H, 7.95; O, 13.94; P, 6.26.

IR spectrum (cm.$^{-1}$, liquid film):

3060 (m.): $\nu$C—H

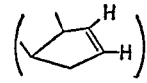

1625 (w.): $\nu$C=C

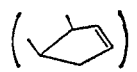

1285 (s.): $\nu$P=O (tertiary ester)
1000 (vs.): $\nu$C—O (P—O—C)

NMR spectrum ($\tau$, CCl$_4$ solution):

4.27 and 4.58 (AB-type quartet, $\underline{J}$=6Hz., 6H):

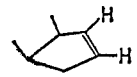

5.4–5.9 (multiplet, 3H):

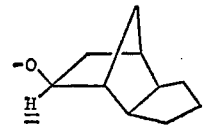

7.2–9.0 (complex multiplet, 30H): other H's on the rings. The fine structure of this multiplet resembles that of the starting alcohol and confirms the existence of the tricyclic ring.

The embodiments of the invention in which an exclusive property or privilege is claimed are defined as follows:
1. A compound of the formula

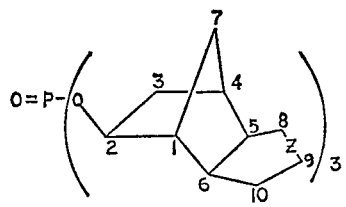

where Z is a single or double bond.

References Cited

Kosolopoff, Organophosphorus Compounds, John Wiley & Sons, Inc., New York, 1950, p. 226.

LEWIS GOTTS, Primary Examiner

R. L. RAYMOND, Assistant Examiner

U.S. Cl. X.R.

250—49.8; 260—958, 974